United States Patent Office 3,840,451
Patented Oct. 8, 1974

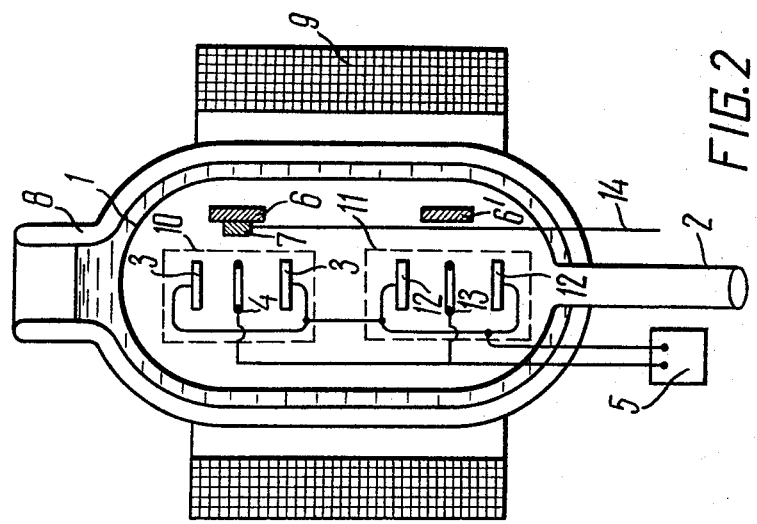
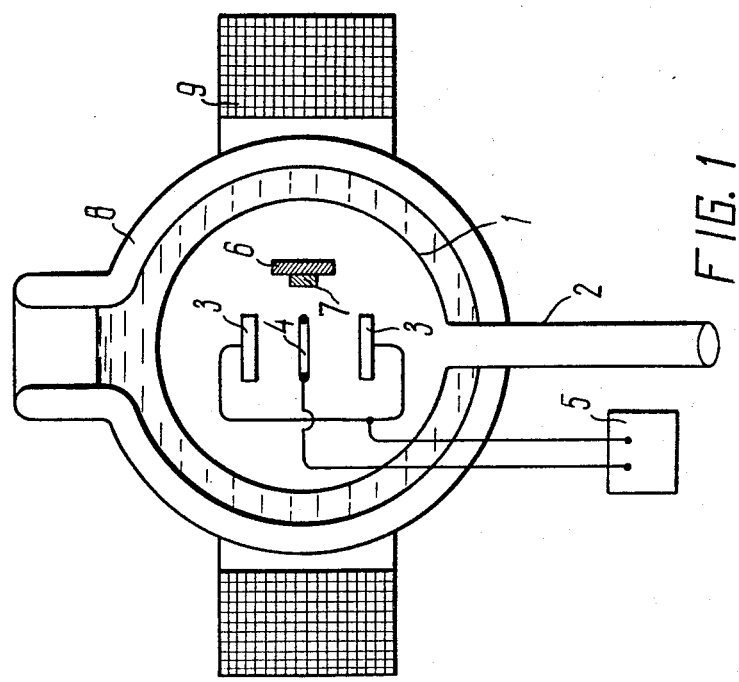

3,840,451
METHOD OF PRODUCING AN ARTIFICIAL
DIAMOND FILM
Vyacheslav Mikhailovich Golyanov, ulitsa Rogova 18, kv. 3, and Alek Platonovich Demidov, ulitsa Rogova 3, kv. 8, both of Moscow, U.S.S.R.
Filed Oct. 24, 1972, Ser. No. 300,350
Claims priority, application U.S.S.R., Oct. 28, 1971, 1708806
Int. Cl. C23c 15/00
U.S. Cl. 204—192                    7 Claims

ABSTRACT OF THE DISCLOSURE

At least two graphite cathodes are simultaneously sputtered in vacuum by ions of an electric discharge in an inert gas. Carbon atoms released during sputtering are deposited onto a solid substrate as a diamond film. The inert gas pressure is maintained from about $10^{-7}$ to about $10^{-4}$ torr.

---

The present invention relates to improvements in the methods of producing super-hard materials and, more particularly, the invention relates to a method of producing artificial diamonds which can be used for obtaining "carbonado" diamonds, diamond films, and "sandwich"-type multilayer coatings.

Well known in the art are two principally different methods of producing artificial diamonds. In accordance with one of them, artificial diamonds are obtained in special high-pressure chambers from graphite subjected to a pressure greater than 50,000 tech. atm. and a temperatures above 1,200° C. According to the other method, artificial diamonds are produced by using a seed crystal under atmospheric pressure and at a temperature of about 1,000° C.

When using high pressures and temperatures, conditions are created under which the obtained diamond is a thermodynamically stable phase. This method, for examples, is suitable for producing artificial diamonds of the "ballas" and "carbonado" types.

The main disadvantage of this method resides in the necessity of creating high pressures and temperatures which complicates the technological process and calls for the use of sophisticated and expensive equipment. It should be also noted that high-pressure chambers have rather limited volumes within which the diamond synthesis is effected. Furthermore, it is not possible to obtain a coating of artificial diamond on articles directly in the process of production of the diamond, which in some cases might be very desirable.

In obtaining diamonds by another method, carbon from a gas phase, for example, methane, is deposited onto the surface of the artificial diamond. In this case, conditions are provided under which the diamond is present in a thermodynamically unstable phase and is subject to graphitization.

As a result, among the deposited atoms of carbon there are formed both diamond and graphite bonds.

The graphite bonds are eliminated due to addition of metallic catalysts or by means of periodic "burning out" of the formed graphite in a hydrogen medium, which somewhat complicates the technological process and reduces the output capacity of the apparatus employing this method.

Other disadvantages of this method are associated with the necessity of using seed crystals of natural diamond. On the one hand, this excludes the possibility of obtaining a diamond coating directly on another material and, on the other hand, such a method involves additional expense so that limitations are imposed on its realization.

Artificial diamonds obtained by any of the above methods have comparatively small linear dimensions: "ballas" artificial diamonds have a diameter of 6 to 6.5 mm., "carbonado" artificial diamonds have a diameter of 4 mm., filamentous crystals have a diameter of 10 to 25 microns at a length of about 2 mm. and artificial diamonds obtained by alternating the two cycles "deposition-rectification" have a length of 1 to 5 microns.

Moreover, none of the above-described methods provides for a possibility of obtaining free diamond films, multilayer film diamond coatings of the "sandwich" type formed by alternating layers of diamonds and other materials.

It should be also kept in mind that diamond is a fragile material, i.e., a diamond monocrystal is easily split up as a result of impact on its cleavage planes. Thus monocrystals of both artificial and natural diamond poorly withstand tensile loads and have a bending strength of 20–40 kg./mm.$^2$, while their compression strength is about 200 kg./mm.$^2$.

It is an object of the present invention to provide a method which will simplify and make less expensive the production of artificial diamonds.

Another object of the invention is to obtain diamond coatings on articles of a different material.

Yet another object of the invention is to obtain multilayer coatings or films of the "sandwich" type formed by alternating layers of diamond and other materials.

Still another object of the invention is to increase the linear dimensions of the obtained diamonds.

An additional object of the invention is to increase the mechanical strength of artificial diamonds, namely, to increase the tensile strength and hardness thereof.

A further object of the present invention is to increase the chemical resistance of diamonds to a highly oxidizing medium at high temperatures, for example, to oxidation in a medium of potassium dichromate dissolved in $H_2SO_4$ at a temperature of 300° C. Among other objects of the invention, we should note the production of diamonds with p- and n-type conductivity. One of the important objects of this invention is to obtain superthin diamnd films or coatings having a thickness of about 5 A.

These and other objects are attained by providing a method of producing artificial diamonds from graphite, in which, according to the invention, at least two graphite cathodes are simultaneously sputtered by ions of an electric discharged in an inert gas, and the carbon atoms escaping from the cathodes are deposited onto a common solid substrate, while the inert gas pressure is maintained such that the escaping carbon atoms reach the substrate surface without colliding with the inert gas particles.

We have found that when accelerated neutral atoms of carbon from at least two converging beams, obtained due to the cathode sputtering of graphite without dispersion in vacuum, precipitate on a substrate, bonds of substantially only the diamond type are formed in the absence of a seed diamond crystal and catalysts. In such a process, the formation of diamond monocrystals proceeds simultaneously and independently at various points on the whole substrate surface; the crystals have an arbitrary orientation relative to each other, are strongly interconnected, and provide for a high resistance to tensile stresses.

The optimum conditions for realizing the proposed method arise when cathode sputtering is performed in a longitudinal magnetic field whose lines of force coincide in direction with the axis of the discharge, while the inert gas pressure is equal to $10^{-7}$ to $10^{-4}$ torr.

The use of a longitudinal magnetic field makes it possible to effect a gas discharge under a pressure that is by several orders of magnitude lower than in the absence of a magnetic field, and this in turn is favorable for a free flight of carbon atoms during the sputtering of the graphite cathode.

When the substrate is cooled down to a very low temperature, the diamond obtained has a high ohmic resistance. From the viewpoint of the technological process and production costs, the most favorable conditions are attained when the substrate is cooled to a temperature of $-196°$ C., because in this case liquid nitrogen can be used as a coolant. Besides this makes it possible to simplify the cooling system, for example, to place the chamber with the substrate and the cathodes to be sputtered into a Dewar vacuum flask.

Investigations indicate that the process of sputtering and deposition is more effective when krypton is used as the inert gas.

In some cases, such as when making integral circuits, it is expedient to make diamonds that feature semiconductor properties. In this case, use should be made of a graphite cathode preferably containing either some amount of a material of the elements of the 3rd group of the Periodic Table to obtain a diamond with p-type conductivity, or some amount of a material of the elements of the 5th group of the Periodic Table to obtain a diamond with n-type conductivity.

Where it is desirable to obtain a free diamond film, the substrate with the deposited graphite atoms is dissolved in a chemical reagent.

The invention will now be explained in greater detail with reference to embodiments thereof which are represented in the accompanying drawings, wherein:

FIG. 1 shows an apparatus for realizing the proposed method;

FIG. 2 is a diagram of an apparatus for obtaining coatings of the "sandwhich" type.

The apparatus for producing artificial diamonds comprises a metal or glass flask 1 with a branch pipe 2 for evacuation of the gas from the flask during vacuum treatment followed by supplying an inert gas therein. Mounted inside the flask 1 are disk graphite cathodes 3 between which is disposed an annular metal anode 4. The cathodes 3 and the anode 4 are fed from a DC source 5. Located within the flask 1 is a holder 6 accommodating a plate 7 made of a material non-sublimating in vacuum and serving as a substrate onto which there are deposited the carbon atoms appearing during cathode sputtering.

The flask 1 together with the cathode 3, anode 4 and holder 6 will be further referred to as reaction chamber.

The reaction chamber is placed into a Dewar vacuum flask 8 filled, in operation, with liquid nitrogen and arranged inside a solenoid 9 setting up a permanent magnetic field whose lines of force coincide with the axis of the discharge initiated between the cathodes and the anode. The system is preferably provided with a non-oil super-high-vacuum pump, for example, a magnetic-discharge pump (not shown) and a removable heater (not shown) for degassing the reaction chamber by means of thermal heating.

The production of artificial diamonds by means of the above-described apparatus is effected as follows:

EXAMPLE 1

The reaction chamber is evacuated by the pump to a vacuum of about $10^{-7}$ torr and is degassed by thermal heating at a temperature of 250–300° C. in the course of a few hours. After degassing, liquid nitrogen is admitted into the Dewar flask 8, and the solenoid 9 is operated to set up a longitudinal magnetic field of about 0.7 kOe., in which case the partial pressure of the residual gases in the reaction chamber is equal to $2 \cdot 10^{-9}$ torr for hydrogen and $10^{-10}$ torr for other residual gases such as water vapors, nitrogen, hydrogen, etc.

Some amount of spectrally pure inert gas, for example krypton, is admitted at a pressure of $10^{-5}$ torr into the reaction chamber.

Other inert gases, i.e. neon, argon, or xenon, can be used instead of krypton.

On applying 4 kv. DC voltage to the apparatus, a gas discharge with a current intensity of 1–2 ma. is initiated between the anode 4 and the cathode 3. In this gas discharge, there occur ionization of the inert gas atoms and formation of ions which are then accelerated by the electric field. The accelerated ions of the inert gas bombard the graphite cathodes and knock out carbon atoms therefrom.

The coefficient of cathode sputtering of graphite in krypton at an accelerating voltage of 4 kv. is equal approximately to 2 at. C/at. Kr.

A beam of knock-on atoms consists of neutral carbon atoms. Most knock-on atoms of carbon have an energy of about 100 electron-volts, which is well in excess of the amounts of heat energy acquired by the carbon atoms during sputtering of graphite in vacuum at a temperature of 3,000° C. Under a pressure of $10^{-5}$ torr in the reaction chamber, the average length of the free flight of separate carbon atoms with an energy of 100 electron-volts considerably exceeds the size of the reaction chamber. Thus, under the action of the gas discharge, from the graphite cathodes there "escape" beams of accelerated carbon atoms depositing onto the plate-substrate 7. It should be noted that the pressure of the inert gas can be of a different value; it is only necessary that the carbon atoms emitted by the cathodes reach the substrate 7 without colliding with the inert gas particles.

Under the above-described conditions, during the condensation of the accelerated carbon atoms on the cold substrate 7, there are formed diamond bonds between the carbon atoms without any seed crystal of natural diamond and catalysts present. As a result, there is gradually formed and grown on the substrate a solid diamond body consisting of a great number of small diamond grains firmly adhering to one another. Such a diamond body consisting of very fine grains belongs to the "carbonado" diamonds according to the present classification of diamond bodies.

EXAMPLE 2

Arranged in the reaction chamber of the above-described apparatus were several substrates 7 of aluminum foil having a thickness of 10 microns. Then, on these substrates, there were deposited carbon atoms forming a diamond film of about 400 A. thickness under the following conditions in the reaction chamber: krypton pressure of $10^{-5}$ torr, partial hydrogen pressure of less than $2 \cdot 10^{-9}$ torr, nitrogen pressure below $10^{-10}$ torr, steam pressure $10^{-10}$ torr, oxygen pressure below $10^{-10}$ torr, pressure of other gases below $10^{-10}$ torr, accelerating voltage of 4 kv., discharge current of 4 ma., magnetic field intensity of the solenoid of 0.7 kOe.; cooling was effected by liquid nitrogen, diamond deposition rate was equal to 5 A./min.

The obtained samples were removed from the reaction chamber and subjected to tensile tests. The synthesized diamond had the following characteristics: tensile strength of 700–800 kg./mm.$^2$, relative elongation of 0.4–0.6%, modulus of elasticity of 150,000 kg./mm.$^2$.

EXAMPLE 3

In the reaction chamber, a disk of pure copper was secured on the holder. Then, the cathodes were subjected to sputtering as described in Example 1. Obtained on the substrate was a diamond layer of about 5 micron thickness. The disk was removed from the reaction chamber and used as a cutting tool.

The diamond coating of the disk was used for treatment of a natural diamond with a weight of about 1 carat over its octahedral face (III) which is known to be the hardest. As a result of such treatment, three cuts, each having a depth of about 25 microns, were obtained at a time on said face of the natural diamond. This is another proof of the high hardness of the diamond obtained by the proposed method.

EXAMPLE 4

Three quartz substrates were placed in the reaction chamber. Then, sputtering of the cathodes and the application of diamond layers on the substrates were performed under the conditions described in Example 1. The obtained diamond had the following characteristics: specific gravity of different samples of $3.7\pm0.4$ g./cm.$^3$, $3.5\pm0.3$ g./cm.$^3$, and $3.4\pm0.13$ g./cm.$^3$ respectively; specific resistance at room temperature of $5\cdot10^6$ ohm·cm.; boundary of ultraviolet absorption of 2,200–2,600 A., refractive index of 2.5 to 2.9. All these characteristics correspond to those of natural diamond.

EXAMPLE 5

Placed in the reaction chamber were substrates of common salt crystals, and carbon was deposited by means of cathode sputtering of graphite until diamond layers 5, 10, 50 and 100 A. thick were obtained on the substrates under the conditions identical to those of Example 1, with the difference that xenon was used instead of krypton. After the process of synthesis was over, the substrates with diamond layers thereon were removed from the reaction chamber and dissolved in water, while the diamond films were caught by means of a copper grid with 0.1 x 0.1 mm. meshes. As a result, free diamond films 5, 10, 50 and 100 A. thick were obtained and examined with the aid of an electronic microscope and an electron-diffraction chamber. The examination has revealed that the obtained diamond had grains less than 10 A. in size. According to the existing classification for diamond bodies, such a diamond is close to the "carbonado" type.

EXAMPLE 6

Placed in the reaction chamber was a substrate of strainless nickel-chrome steel measuring 20 x 60 x 0.5 mm. The conditions for producing a diamond were identical to those described in Example 1, with the difference that argon under a pressure of $10^{-4}$ torr was used as the inert gas. By means of a special magnet (not shown) mounted outside the reaction chamber, the substrate was slowly moved, thus providing for uniform coating of the entire surface. As a result, a diamond film measuring 20 x 60 mm. was obtained on the stainless steel.

EXAMPLE 7

A substrate of monocrystalline silicon was placed in the reaction chamber. On this substrate, there was obtained a diamond film having a thickness of 1,000 A. under the conditions identical to those described in Example 1. Then, several large contact platforms of gold were thermally sprayed onto the diamond. By applying a voltage between the silicon and gold, the electric strength of the diamond was determined which was found to be $2\cdot10^6$ v./cm., which corresponds to the electric strength of dielectric materials.

EXAMPLE 8

A quartz substrate was placed in the reaction chamber. Made in the graphite cathode was a recess (not shown) which was filled with boron carbide. Cathode sputtering was effected as described in Example 1, in which case boron atoms escaped together with carbon atoms. As a result, a diamond doped with boron atoms was formed on the substrate. The examination of such a diamond has revealed that it had a p-type conductivity. The electric conductivity of the diamond can be controlled by varying the quantity of carbide introduced into the graphite cathode.

Other materials containing elements of the 3rd group of the Periodic Table, as well as chemically pure elements of the same group can be used instead of boron carbide.

EXAMPLE 9

A quartz substrate was placed into the reaction chamber. The graphite cathode had a recess into which was placed a piece of metallic bismuth. Cathode sputtering was effected as described in Example 1, in which case bismuth atoms escaped together with carbon atoms simultaneously. As a result, a diamond doped with bismuth atoms was formed on the substrate.

Investigations have revealed that such a diamond was a good current conductor and had an n-type conductivity.

Other materials containing elements of the 5th group of the Periodic Table can be used instead of bismuth.

The electrical conductivity of the diamond can be controlled by varying the amount of bismuth to be introduced into the graphite cathode.

EXAMPLE 10

A quartz substrate was placed in the reaction chamber and cathode sputtering was effected as described in Example 1. Then, the obtained artificial diamond together with the substrate were etched at a temperature of 300° C. in a cleaning mixture consisting of a saturated solution of potassium bichromate ($K_2Cr_4O_7$) in concentrated sulphuric acid ($H_2SO_4$). After the etching, the weight of the diamond was determined, in which case weighing was done by measuring the density of blackening before and after the etching. The density of blackening is proportional to the thickness and, consequently, to the weight of the film.

Investigations have revealed that potassium bichromate does not affect the artificial diamond even at a temperature of 300° C., while potassium bichromate in $H_2SO_4$ partially oxidizes natural diamond into $CO_2$. Such a distinction in the behavior of the obtained artificial diamond from that of a natural diamond allowed us to draw a conclusion that the obtained product had a higher chemical resistance than natural diamond.

EXAMPLE 11

A substrate of natural diamond was placed in the reaction chamber. Cathode sputtering was effected as described in Example 1, with the difference that neon was used as the inert gas. As a result, a film of artificial diamond was obtained on the natural diamond. The film was brown in color, had a high resistance, and was firmly bound with the natural diamond crystal, Such technique can be used for restoring the damaged or worn portions of diamond articles, particularly diamond dies.

EXAMPLE 12

To obtain multilayer articles or multilayer coatings of the "sandwich" type on an article (substrate), the device shown in FIG. 2 can be employed. This device is substantially identical to that shown in FIG. 1. The only difference is that two cathode-anode cells 10 and 11 are mounted in the flask 1. By a cathode-anode cell is meant an assembly of two cathodes and an anode located therebetween.

These cells are arranged one under the other. The cell 10 is formed by two graphite cathodes 3 and a metal anode 4, while the cell 11 is formed by two molybdenum cathodes 12 and a metal anode 13. Instead of molybdenum, there can be used another material from which we intend to obtain one of the intermediate layers of the "sandwich."

A manipulator 14 is provided for moving the substrate on which a multilayer coating is to be formed.

The layers of the coatings are obtained as follows: the substrate is mounted on the holder 6 and the graphite electrodes are sputtered under conditions corresponding to those described in Example 1. As a result, a diamond layer is obtained on the substrate. Then, the substrate is moved by the manipulator 14 into the holder 6, and the molybdenum cathodes are sputtered, thus forming another layer. By shifting the substrate from one position to another, as described above, it is possible to obtain multilayer coatings. We obtained a sample containing forty layers (twenty layers of molybdenum and twenty layers of artificial diamond sandwiched between one other). The temperature of transition of such a sample into the superconducting state was found to be much higher than the temperature of transition of mm. pure molybdenum into the same state ($T_c^{sandwich} = 7.3°$ K., $T_c^{molybdenum} = 0.93°$ K.).

The proposed invention makes it possible to substantially simplify the process of producing artificial diamonds and, what is most important, to obtain superthin and multilayer diamond films which so far are not commercially available.

What is claimed is:

1. A method of producing artificial diamond films which comprises sputtering at least two graphite cathodes simultaneously by ions of an electric discharge in an inert gas at a pressure of about $10^{-7}$ to $10^{-4}$ torr, to thereby form at least two atomic beams of carbon, the inert gas pressure being maintained such that neutral carbon atoms emitted from the cathodes reach the substrate surface without colliding with the inert gas particles, said atomic beams of carbon being deposited on said common solid substrate with overlapping on the surface thereof to thereby form said diamond film.

2. A method as claimed in Claim 1, in which cathode sputtering is effected in a longitudinal magnetic field whose lines of force coincide in directions with the axis of the discharge.

3. A method as claimed in Claim 1, in which the substrate temperature is maintained close to $-196°$ C.

4. A method as claimed in Claim 1, in which krypton is used as the inert gas.

5. A method as claimed in Claim 1, in which the graphite cathodes to be sputtered contain some amount of material of the elements of the 3rd group of the Periodic Table so that the produced artificial diamond features semiconductor properties of p-type conductivity.

6. A method as claimed in Claim 1, in which the graphite cathodes to be sputtered contain some amount of material of the elements of the 5th group of the Periodic Table so that the produced artificial diamond features semiconductor properties of n-type conductivity.

7. A method as claimed in Claim 1, in which, after the production of the diamond, the substrate is dissolved in a chemical reagent to obtain a free diamond film.

References Cited

UNITED STATES PATENTS 3,207,882   9/1965   Inoue _____ 204—173

OTHER REFERENCES

*Iron Age*, May 20, 1971, New Methods Aim at Deposition, by T. H. Malim, p. 61.

Ion Beam Deposition of Thin Films of Diamondlike Carbon, by Sol Eisenberg et al., Jour. of Applied Physics, vol. 42, No. 7, June 1971, pp. 2953–2958.

THOMAS M. TUFARIELLO, Primary Examiner

U.S. Cl. X.R.

204—298